US008976265B2

(12) United States Patent
Marks et al.

(10) Patent No.: US 8,976,265 B2
(45) Date of Patent: Mar. 10, 2015

(54) APPARATUS FOR IMAGE AND SOUND CAPTURE IN A GAME ENVIRONMENT

(75) Inventors: Richard L. Marks, Foster City, CA (US); Xiadong Mao, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 450 days.

(21) Appl. No.: 13/282,386

(22) Filed: Oct. 26, 2011

(65) Prior Publication Data
US 2012/0046101 A1 Feb. 23, 2012

Related U.S. Application Data

(63) Continuation of application No. 12/820,618, filed on Jun. 22, 2010, now Pat. No. 8,723,984, which is a continuation of application No. 11/429,133, filed on May 4, 2006, now Pat. No. 7,760,248, and a
(Continued)

(51) Int. Cl.
*H04N 5/76* (2006.01)
*H04R 3/00* (2006.01)
(Continued)

(52) U.S. Cl.
CPC . *H04S 7/30* (2013.01); *A63F 13/00* (2013.01); *A63F 13/04* (2013.01); *G06F 3/017* (2013.01); *A63F 2300/1012* (2013.01); *A63F 2300/1093* (2013.01); *A63F 2300/6045* (2013.01)
USPC .......................................... 348/231.4; 381/92

(58) Field of Classification Search
CPC ........... H04R 1/08; H04N 5/772; A63F 13/06
USPC .................... 348/231.4; 463/3, 4; 381/91, 92, 381/111–115
See application file for complete search history.

(56) References Cited

U.S. PATENT DOCUMENTS 3,943,277 A 3/1976 Everly et al.
4,263,504 A 4/1981 Thomas
(Continued)

FOREIGN PATENT DOCUMENTS

EP 0 353 200 1/1990
EP 0 613 294 8/1994
(Continued)

OTHER PUBLICATIONS

Bolt, R.A., "Put-That-There": Voice and Gesture at the Graphics Interface, Computer Graphics, vol. 14, No. 3 (ACM SIGGRAPH Conf. Proceedings) Jul. 1980, pp. 262-270.
(Continued)

*Primary Examiner* — Mekonnen Dagnew
(74) *Attorney, Agent, or Firm* — Martine Penilla Group, LLP

(57) ABSTRACT

An apparatus for capturing image and sound during interactivity with a computer game in a game environment is provided. The apparatus includes a housing and a base stand for supporting the housing. An image capture device is defined along a front portion of the housing. Also, an array of microphones is defined along the front portion of the housing. The array of microphones is defined by a single microphone positioned on a first lateral side of the image capture device and two or more microphones positioned on a second lateral side of the image capture device opposite the first side. The apparatus also includes a connector for connecting to a computing device.

18 Claims, 6 Drawing Sheets

Related U.S. Application Data continuation-in-part of application No. 10/207,677, filed on Jul. 27, 2002, now Pat. No. 7,102,615, and a continuation-in-part of application No. 10/650,409, filed on Aug. 27, 2003, now Pat. No. 7,613,310, and a continuation-in-part of application No. 10/663,236, filed on Sep. 15, 2003, now Pat. No. 7,883,415, and a continuation-in-part of application No. 10/759,782, filed on Jan. 16, 2004, now Pat. No. 7,623,115, and a continuation-in-part of application No. 10/820,469, filed on Apr. 7, 2004, now Pat. No. 7,970,147, and a continuation-in-part of application No. 11/301,673, filed on Dec. 12, 2005, now Pat. No. 7,646,372.

(60) Provisional application No. 60/678,413, filed on May 5, 2006, provisional application No. 60/718,145, filed on Sep. 15, 2005.

(51) Int. Cl.
*H04S 7/00* (2006.01)
*A63F 13/00* (2014.01)
*A63F 13/219* (2014.01)
*G06F 3/01* (2006.01)

(56) References Cited

U.S. PATENT DOCUMENTS

| | | | |
|---|---|---|---|
| 4,313,227 A | 1/1982 | Eder | |
| 4,558,864 A | 12/1985 | Medwedeff | |
| 4,565,999 A | 1/1986 | King et al. | |
| 4,787,051 A | 11/1988 | Olson | |
| 4,802,227 A | 1/1989 | Elko et al. | |
| 4,823,001 A | 4/1989 | Kobayashi et al. | |
| 4,843,568 A | 6/1989 | Krueger et al. | |
| 4,963,858 A | 10/1990 | Chien | |
| 5,034,986 A | 7/1991 | Karmann et al. | |
| 5,055,840 A | 10/1991 | Bartlett | |
| 5,111,401 A | 5/1992 | Everett et al. | |
| 5,128,671 A | 7/1992 | Thomas, Jr. | |
| 5,144,594 A | 9/1992 | Gilchrist | |
| 5,195,179 A | 3/1993 | Tokunaga | |
| 5,260,556 A | 11/1993 | Lake et al. | |
| 5,297,061 A | 3/1994 | Dementhon et al. | |
| 5,335,011 A | 8/1994 | Addeo et al. | |
| 5,394,168 A | 2/1995 | Smith, III et al. | |
| 5,426,450 A | 6/1995 | Drumm | |
| 5,435,554 A | 7/1995 | Lipson | |
| 5,455,685 A | 10/1995 | Mori | |
| 5,473,701 A | 12/1995 | Cezanne et al. | |
| 5,485,273 A | 1/1996 | Mark et al. | |
| 5,517,333 A | 5/1996 | Tamura et al. | |
| 5,528,265 A | 6/1996 | Harrison | |
| 5,534,917 A | 7/1996 | MacDougall | |
| 5,543,818 A | 8/1996 | Scott | |
| 5,557,684 A | 9/1996 | Wang et al. | |
| 5,563,988 A | 10/1996 | Maes et al. | |
| 5,568,928 A | 10/1996 | Munson et al. | |
| 5,581,276 A | 12/1996 | Cipolla et al. | |
| 5,583,478 A | 12/1996 | Renzi | |
| 5,586,231 A | 12/1996 | Florent et al. | |
| 5,611,000 A | 3/1997 | Szeliski et al. | |
| 5,611,731 A | 3/1997 | Bouton et al. | |
| 5,616,078 A | 4/1997 | Oh | |
| 5,638,228 A | 6/1997 | Thomas, III | |
| 5,649,021 A | 7/1997 | Matey et al. | |
| 5,675,825 A | 10/1997 | Dreyer et al. | |
| 5,675,828 A | 10/1997 | Stoel et al. | |
| 5,677,710 A | 10/1997 | Thompson-Rohrlich | |
| 5,704,836 A | 1/1998 | Norton et al. | |
| 5,706,364 A | 1/1998 | Kopec et al. | |
| 5,768,415 A | 6/1998 | Jagadish et al. | |
| 5,796,354 A | 8/1998 | Cartabiano et al. | |
| 5,818,424 A | 10/1998 | Korth | |
| 5,846,086 A | 12/1998 | Bizzi et al. | |
| 5,850,222 A | 12/1998 | Cone | |
| 5,850,473 A | 12/1998 | Andersson | |
| 5,861,910 A | 1/1999 | McGarry et al. | |
| 5,870,100 A | 2/1999 | DeFreitas | |
| 5,883,616 A | 3/1999 | Koizumi et al. | |
| 5,889,672 A | 3/1999 | Schuler et al. | |
| 5,900,863 A | 5/1999 | Numazaki | |
| 5,913,727 A | 6/1999 | Ahdoot | |
| 5,914,723 A | 6/1999 | Gajewska | |
| 5,917,493 A | 6/1999 | Tan et al. | |
| 5,917,936 A | 6/1999 | Katto | |
| 5,923,306 A | 7/1999 | Smith et al. | |
| 5,923,318 A | 7/1999 | Zhai et al. | |
| 5,929,444 A | 7/1999 | Leichner | |
| 5,930,383 A | 7/1999 | Netzer | |
| 5,930,741 A | 7/1999 | Kramer | |
| 5,937,081 A | 8/1999 | O'Brill et al. | |
| 5,959,596 A | 9/1999 | McCarten et al. | |
| 5,963,250 A | 10/1999 | Parker et al. | |
| 5,978,772 A | 11/1999 | Mold | |
| 5,993,314 A | 11/1999 | Dannenberg et al. | |
| 6,009,210 A | 12/1999 | Kang | |
| 6,014,167 A | 1/2000 | Suito et al. | |
| 6,021,219 A | 2/2000 | Andersson et al. | |
| 6,031,545 A | 2/2000 | Ellenby et al. | |
| 6,031,934 A | 2/2000 | Ahmad et al. | |
| 6,037,942 A | 3/2000 | Millington | |
| 6,044,181 A | 3/2000 | Szeliski et al. | |
| 6,049,619 A | 4/2000 | Anandan et al. | |
| 6,056,640 A | 5/2000 | Schaaij | |
| 6,057,909 A | 5/2000 | Yahav et al. | |
| 6,061,055 A | 5/2000 | Marks | |
| 6,075,895 A | 6/2000 | Qiao et al. | |
| 6,091,905 A | 7/2000 | Yahav et al. | |
| 6,094,625 A | 7/2000 | Ralston | |
| 6,097,369 A | 8/2000 | Wambach | |
| 6,100,517 A | 8/2000 | Yahav et al. | |
| 6,100,895 A | 8/2000 | Miura et al. | |
| 6,101,289 A | 8/2000 | Kellner | |
| 6,115,052 A | 9/2000 | Freeman et al. | |
| 6,134,346 A | 10/2000 | Berman et al. | |
| 6,144,367 A | 11/2000 | Berstis | |
| 6,151,009 A | 11/2000 | Kanade et al. | |
| 6,157,368 A | 12/2000 | Fager | |
| 6,160,540 A | 12/2000 | Fishkin et al. | |
| 6,166,744 A | 12/2000 | Jaszlics et al. | |
| 6,173,059 B1 | 1/2001 | Huang et al. | |
| 6,175,343 B1 | 1/2001 | Mitchell et al. | |
| 6,184,863 B1 | 2/2001 | Sibert et al. | |
| 6,191,773 B1 | 2/2001 | Maruno et al. | |
| 6,195,104 B1 | 2/2001 | Lyons | |
| 6,243,074 B1 | 6/2001 | Fishkin et al. | |
| 6,243,491 B1 | 6/2001 | Andersson | |
| 6,275,213 B1 | 8/2001 | Tremblay et al. | |
| 6,281,930 B1 | 8/2001 | Parker et al. | |
| 6,282,362 B1 | 8/2001 | Murphy et al. | |
| 6,295,064 B1 | 9/2001 | Yamaguchi | |
| 6,297,838 B1 | 10/2001 | Chang et al. | |
| 6,304,267 B1 | 10/2001 | Sata | |
| 6,307,549 B1 | 10/2001 | King et al. | |
| 6,307,568 B1 | 10/2001 | Rom | |
| 6,323,839 B1 | 11/2001 | Fukuda et al. | |
| 6,323,942 B1 | 11/2001 | Bamji | |
| 6,326,901 B1 | 12/2001 | Gonzales | |
| 6,327,073 B1 | 12/2001 | Yahav et al. | |
| 6,331,911 B1 | 12/2001 | Manassen et al. | |
| 6,346,929 B1 | 2/2002 | Fukushima et al. | |
| 6,351,661 B1 | 2/2002 | Cosman | |
| 6,371,849 B1 | 4/2002 | Togami | |
| 6,375,572 B1 | 4/2002 | Masuyama et al. | |
| 6,392,644 B1 | 5/2002 | Miyata et al. | |
| 6,393,142 B1 | 5/2002 | Swain et al. | |
| 6,394,897 B1 | 5/2002 | Togami | |
| 6,400,374 B2 | 6/2002 | Lanier | |
| 6,409,602 B1 | 6/2002 | Wiltshire et al. | |
| 6,411,392 B1 | 6/2002 | Bender et al. | |
| 6,411,744 B1 | 6/2002 | Edwards | |
| 6,417,836 B1 | 7/2002 | Kumar et al. | |

(56) References Cited

U.S. PATENT DOCUMENTS

| | | | |
|---|---|---|---|
| 6,441,825 B1 | 8/2002 | Peters | |
| 6,473,516 B1 | 10/2002 | Kawaguchi et al. | |
| 6,498,860 B1 | 12/2002 | Sasaki et al. | |
| 6,504,535 B1 | 1/2003 | Edmark | |
| 6,513,160 B2 | 1/2003 | Dureau | |
| 6,516,466 B1 | 2/2003 | Jackson | |
| 6,519,359 B1 | 2/2003 | Nafis et al. | |
| 6,533,420 B1 | 3/2003 | Eichenlaub | |
| 6,542,927 B2 | 4/2003 | Rhoads | |
| 6,545,706 B1 | 4/2003 | Edwards et al. | |
| 6,546,153 B1 | 4/2003 | Hoydal | |
| 6,556,704 B1 | 4/2003 | Chen | |
| 6,577,748 B2 | 6/2003 | Chang | |
| 6,580,414 B1 | 6/2003 | Wergen et al. | |
| 6,580,415 B1 | 6/2003 | Kato et al. | |
| 6,587,573 B1 | 7/2003 | Stam et al. | |
| 6,587,835 B1 | 7/2003 | Treyz et al. | |
| 6,593,956 B1 | 7/2003 | Potts et al. | |
| 6,595,642 B2 | 7/2003 | Wirth | |
| 6,618,073 B1 | 9/2003 | Lambert et al. | |
| 6,621,938 B1 | 9/2003 | Tanaka et al. | |
| 6,628,265 B2 | 9/2003 | Hwang | |
| 6,674,415 B2 | 1/2004 | Nakamura et al. | |
| 6,676,522 B2 | 1/2004 | Rowe et al. | |
| 6,677,967 B2 | 1/2004 | Sawano et al. | |
| 6,677,987 B1 | 1/2004 | Girod | |
| 6,709,108 B2 | 3/2004 | Levine et al. | |
| 6,712,703 B2 | 3/2004 | Miyamoto et al. | |
| 6,720,949 B1 | 4/2004 | Pryor et al. | |
| 6,727,988 B2 | 4/2004 | Kim et al. | |
| 6,741,741 B2 | 5/2004 | Farrell | |
| 6,746,124 B2 | 6/2004 | Fischer et al. | |
| 6,749,510 B2 | 6/2004 | Giobbi | |
| 6,751,338 B1 | 6/2004 | Wallack | |
| 6,753,849 B1 | 6/2004 | Curran et al. | |
| 6,767,282 B2 | 7/2004 | Matsuyama et al. | |
| 6,769,769 B2 | 8/2004 | Podoleanu et al. | |
| 6,772,057 B2 | 8/2004 | Breed et al. | |
| 6,785,329 B1 | 8/2004 | Pan et al. | |
| 6,789,967 B1 | 9/2004 | Forester | |
| 6,791,531 B1 | 9/2004 | Johnston et al. | |
| 6,795,068 B1 | 9/2004 | Marks | |
| 6,809,776 B1 | 10/2004 | Simpson | |
| 6,819,318 B1 | 11/2004 | Geng | |
| 6,846,238 B2 | 1/2005 | Wells | |
| 6,847,311 B2 | 1/2005 | Li | |
| 6,863,609 B2 | 3/2005 | Okuda et al. | |
| 6,870,526 B2 | 3/2005 | Zngf et al. | |
| 6,873,747 B2 | 3/2005 | Askary | |
| 6,881,147 B2 | 4/2005 | Naghi et al. | |
| 6,884,171 B2 | 4/2005 | Eck et al. | |
| 6,890,262 B2 | 5/2005 | Oishi et al. | |
| 6,917,688 B2 | 7/2005 | Yu et al. | |
| 6,919,824 B2 | 7/2005 | Lee | |
| 6,924,787 B2 | 8/2005 | Kramer et al. | |
| 6,928,180 B2 | 8/2005 | Stam et al. | |
| 6,930,725 B1 | 8/2005 | Hayashi | |
| 6,931,125 B2 | 8/2005 | Smallwood | |
| 6,931,596 B2 | 8/2005 | Gutta et al. | |
| 6,943,776 B2 | 9/2005 | Ehrenburg | |
| 6,945,653 B2 | 9/2005 | Kobori et al. | |
| 6,947,576 B2 | 9/2005 | Stam et al. | |
| 6,952,198 B2 | 10/2005 | Hansen | |
| 6,965,362 B1 | 11/2005 | Ishizuka | |
| 6,970,183 B1 | 11/2005 | Monroe | |
| 6,990,639 B2 | 1/2006 | Wilson | |
| 7,006,009 B2 | 2/2006 | Newman | |
| 7,016,411 B2 | 3/2006 | Azuma et al. | |
| 7,016,532 B2 | 3/2006 | Boncyk et al. | |
| 7,023,475 B2 | 4/2006 | Bean et al. | |
| 7,039,199 B2 | 5/2006 | Rui | |
| 7,039,253 B2 | 5/2006 | Matsuoka et al. | |
| 7,042,440 B2 | 5/2006 | Pryor et al. | |
| 7,043,056 B2 | 5/2006 | Edwards et al. | |
| 7,054,452 B2 | 5/2006 | Ukita | |
| 7,059,962 B2 | 6/2006 | Watashiba | |
| 7,061,507 B1 | 6/2006 | Tuomi et al. | |
| 7,071,914 B1 | 7/2006 | Marks | |
| 7,084,887 B1 | 8/2006 | Sato et al. | |
| 7,090,352 B2 | 8/2006 | Kobori et al. | |
| 7,098,891 B1 | 8/2006 | Pryor | |
| 7,102,615 B2 | 9/2006 | Marks | |
| 7,106,366 B2 | 9/2006 | Parker et al. | |
| 7,113,635 B2 | 9/2006 | Robert et al. | |
| 7,116,330 B2 | 10/2006 | Marshall et al. | |
| 7,116,342 B2 | 10/2006 | Dengler et al. | |
| 7,121,946 B2 | 10/2006 | Paul et al. | |
| 7,139,767 B1 * | 11/2006 | Taylor et al. | 1/1 |
| 7,148,922 B2 | 12/2006 | Shimada | |
| 7,156,311 B2 | 1/2007 | Attia et al. | |
| 7,158,118 B2 | 1/2007 | Liberty | |
| 7,161,634 B2 | 1/2007 | Long | |
| 7,164,413 B2 | 1/2007 | Davis et al. | |
| 7,174,312 B2 | 2/2007 | Harper et al. | |
| 7,183,929 B1 | 2/2007 | Antebi et al. | |
| 7,206,418 B2 | 4/2007 | Yang et al. | |
| 7,212,308 B2 | 5/2007 | Morgan | |
| 7,223,173 B2 | 5/2007 | Masuyama et al. | |
| 7,224,384 B1 | 5/2007 | Iddan et al. | |
| 7,227,526 B2 | 6/2007 | Hildreth et al. | |
| 7,227,976 B1 | 6/2007 | Jung et al. | |
| 7,239,301 B2 | 7/2007 | Liberty et al. | |
| 7,245,273 B2 | 7/2007 | Eberl et al. | |
| 7,259,375 B2 | 8/2007 | Tichit et al. | |
| 7,262,760 B2 | 8/2007 | Liberty | |
| 7,263,462 B2 | 8/2007 | Funge et al. | |
| 7,274,305 B1 | 9/2007 | Luttrell | |
| 7,283,679 B2 | 10/2007 | Okada et al. | |
| 7,296,007 B1 | 11/2007 | Funge et al. | |
| 7,301,530 B2 | 11/2007 | Lee et al. | |
| 7,301,547 B2 | 11/2007 | Martins et al. | |
| 7,305,114 B2 | 12/2007 | Wolff et al. | |
| 7,346,387 B1 | 3/2008 | Wachter et al. | |
| 7,352,359 B2 | 4/2008 | Zalewski et al. | |
| 7,364,297 B2 | 4/2008 | Goldfain et al. | |
| 7,379,559 B2 | 5/2008 | Wallace et al. | |
| 7,391,409 B2 | 6/2008 | Zalewski et al. | |
| 7,414,611 B2 | 8/2008 | Liberty | |
| 7,436,887 B2 | 10/2008 | Yeredor et al. | |
| 7,446,650 B2 | 11/2008 | Scholfield et al. | |
| 7,489,298 B2 | 2/2009 | Liberty et al. | |
| 7,489,299 B2 | 2/2009 | Liberty et al. | |
| 7,545,926 B2 | 6/2009 | Mao | |
| 7,555,157 B2 | 6/2009 | Davidson et al. | |
| 7,558,698 B2 | 7/2009 | Funge et al. | |
| 7,613,610 B1 | 11/2009 | Zimmerman et al. | |
| 7,623,115 B2 | 11/2009 | Marks | |
| 7,627,139 B2 | 12/2009 | Marks et al. | |
| 7,636,645 B1 | 12/2009 | Yen et al. | |
| 7,636,697 B1 | 12/2009 | Dobson et al. | |
| 7,636,701 B2 | 12/2009 | Funge et al. | |
| 7,646,372 B2 | 1/2010 | Marks et al. | |
| 7,665,041 B2 | 2/2010 | Wilson et al. | |
| 7,697,700 B2 | 4/2010 | Mao | |
| 7,721,231 B2 | 5/2010 | Wilson | |
| 7,815,507 B2 | 10/2010 | Parrott et al. | |
| 2001/0056477 A1 | 12/2001 | McTernan et al. | |
| 2002/0010655 A1 | 1/2002 | Kjallstrom | |
| 2002/0021811 A1 | 2/2002 | Kubota | |
| 2002/0023027 A1 | 2/2002 | Simonds | |
| 2002/0036617 A1 | 3/2002 | Pryor | |
| 2002/0041327 A1 | 4/2002 | Hildreth et al. | |
| 2002/0056114 A1 | 5/2002 | Fillebrown et al. | |
| 2002/0072414 A1 | 6/2002 | Stylinski et al. | |
| 2002/0075286 A1 | 6/2002 | Yonezawa et al. | |
| 2002/0083461 A1 | 6/2002 | Hutcheson et al. | |
| 2002/0085097 A1 | 7/2002 | Colmenarez et al. | |
| 2002/0094189 A1 | 7/2002 | Navab et al. | |
| 2002/0110273 A1 | 8/2002 | Dufour | |
| 2002/0126899 A1 | 9/2002 | Farrell | |
| 2002/0134151 A1 | 9/2002 | Naruoka et al. | |
| 2002/0158873 A1 | 10/2002 | Williamson | |
| 2003/0003991 A1 | 1/2003 | Kuraishi | |
| 2003/0014212 A1 | 1/2003 | Ralston et al. | |

(56) References Cited

U.S. PATENT DOCUMENTS

| | | |
|---|---|---|
| 2003/0020718 A1 | 1/2003 | Marshall et al. |
| 2003/0022716 A1 | 1/2003 | Park et al. |
| 2003/0032466 A1 | 2/2003 | Watashiba |
| 2003/0032484 A1 | 2/2003 | Ohshima et al. |
| 2003/0093591 A1 | 5/2003 | Hohl |
| 2003/0100363 A1 | 5/2003 | Ali |
| 2003/0123705 A1 | 7/2003 | Stam et al. |
| 2003/0160862 A1 | 8/2003 | Charlier et al. |
| 2003/0232649 A1 | 12/2003 | Gizis et al. |
| 2004/0001082 A1 | 1/2004 | Said |
| 2004/0017355 A1 | 1/2004 | Shim |
| 2004/0035925 A1 | 2/2004 | Wu et al. |
| 2004/0041902 A1* | 3/2004 | Washington ............... 348/14.01 |
| 2004/0054512 A1 | 3/2004 | Kim et al. |
| 2004/0063480 A1 | 4/2004 | Wang |
| 2004/0070565 A1 | 4/2004 | Nayar et al. |
| 2004/0087366 A1 | 5/2004 | Shum et al. |
| 2004/0095327 A1 | 5/2004 | Lo |
| 2004/0140955 A1 | 7/2004 | Metz |
| 2004/0150728 A1 | 8/2004 | Ogino |
| 2004/0178576 A1 | 9/2004 | Hillis et al. |
| 2004/0189720 A1 | 9/2004 | Wilson et al. |
| 2004/0212589 A1 | 10/2004 | Hall et al. |
| 2004/0213419 A1 | 10/2004 | Varma et al. |
| 2004/0227725 A1 | 11/2004 | Calarco et al. |
| 2004/0239670 A1* | 12/2004 | Marks ........................... 345/419 |
| 2004/0254017 A1 | 12/2004 | Cheng |
| 2005/0031166 A1* | 2/2005 | Fujimura et al. .............. 382/103 |
| 2005/0037844 A1 | 2/2005 | Shum et al. |
| 2005/0047611 A1 | 3/2005 | Mao |
| 2005/0088369 A1 | 4/2005 | Yoshioka |
| 2005/0102374 A1 | 5/2005 | Moragne et al. |
| 2005/0105777 A1 | 5/2005 | Koslowski et al. |
| 2005/0117045 A1 | 6/2005 | Abdellatif et al. |
| 2005/0140810 A1* | 6/2005 | Ozawa .................... 348/333.02 |
| 2005/0162384 A1 | 7/2005 | Yokoyama |
| 2005/0198095 A1 | 9/2005 | Du et al. |
| 2005/0226431 A1 | 10/2005 | Mao |
| 2005/0239548 A1 | 10/2005 | Ueshima et al. |
| 2006/0033713 A1 | 2/2006 | Pryor |
| 2006/0035710 A1 | 2/2006 | Festejo et al. |
| 2006/0038819 A1 | 2/2006 | Festejo et al. |
| 2006/0204012 A1 | 9/2006 | Marks et al. |
| 2006/0233389 A1 | 10/2006 | Mao et al. |
| 2006/0252541 A1 | 11/2006 | Zalewski et al. |
| 2006/0252543 A1 | 11/2006 | Van Noland et al. |
| 2006/0256081 A1 | 11/2006 | Zalewski et al. |
| 2006/0264258 A1 | 11/2006 | Zalewski et al. |
| 2006/0264259 A1 | 11/2006 | Zalewski et al. |
| 2006/0264260 A1 | 11/2006 | Zalewski et al. |
| 2006/0269072 A1 | 11/2006 | Mao |
| 2006/0269073 A1 | 11/2006 | Mao |
| 2006/0274032 A1 | 12/2006 | Mao et al. |
| 2006/0274911 A1 | 12/2006 | Mao et al. |
| 2006/0280312 A1 | 12/2006 | Mao |
| 2006/0282873 A1 | 12/2006 | Zalewski et al. |
| 2006/0287084 A1 | 12/2006 | Mao et al. |
| 2006/0287085 A1 | 12/2006 | Mao et al. |
| 2006/0287086 A1 | 12/2006 | Zalewski et al. |
| 2006/0287087 A1 | 12/2006 | Zalewski et al. |
| 2007/0015559 A1 | 1/2007 | Zalewski et al. |
| 2007/0021208 A1 | 1/2007 | Mao et al. |
| 2007/0025562 A1 | 2/2007 | Zalewski et al. |
| 2007/0061413 A1 | 3/2007 | Larsen et al. |
| 2007/0066394 A1 | 3/2007 | Ikeda et al. |
| 2007/0072675 A1 | 3/2007 | Hammano et al. |
| 2007/0120834 A1 | 5/2007 | Boillot |
| 2007/0120996 A1 | 5/2007 | Boillot |
| 2007/0260340 A1 | 11/2007 | Mao |
| 2007/0260517 A1 | 11/2007 | Zalewski et al. |
| 2007/0261077 A1 | 11/2007 | Zalewski et al. |
| 2008/0056561 A1 | 3/2008 | Sawachi |
| 2008/0070684 A1 | 3/2008 | Haigh-Hutchinson |
| 2008/0091421 A1 | 4/2008 | Gustavsson |
| 2008/0208613 A1 | 8/2008 | Scibora |
| 2009/0010494 A1 | 1/2009 | Bechtel et al. |
| 2009/0016642 A1 | 1/2009 | Hart |
| 2009/0221368 A1 | 9/2009 | Yen et al. |
| 2009/0221374 A1 | 9/2009 | Yen et al. |
| 2009/0288064 A1 | 11/2009 | Yen et al. |
| 2010/0004896 A1 | 1/2010 | Yen et al. |
| 2010/0137064 A1 | 6/2010 | Shum et al. |

FOREIGN PATENT DOCUMENTS

| | | |
|---|---|---|
| EP | 0 652 686 | 5/1995 |
| EP | 0 750 202 | 12/1996 |
| EP | 0 823 683 | 2/1998 |
| EP | 0 835 676 | 4/1998 |
| EP | 1 435 258 | 7/2004 |
| FR | 2814695 | 4/2002 |
| FR | 2832892 | 5/2003 |
| GB | 2 206 716 | 1/1989 |
| GB | 2 376 397 | 12/2002 |
| GB | 2 388 418 | 11/2003 |
| JP | 1284897 | 11/1989 |
| JP | 6102980 | 4/1994 |
| JP | 9128141 | 5/1997 |
| JP | 9185456 | 7/1997 |
| JP | 11-038949 | 2/1999 |
| JP | 2000-172431 | 6/2000 |
| JP | 2000-259856 | 9/2000 |
| JP | 2000-350859 | 12/2000 |
| JP | 2001-166676 | 6/2001 |
| JP | 2002-369969 | 12/2002 |
| JP | 2004-145448 | 5/2004 |
| WO | 88/05942 | 8/1988 |
| WO | 98/48571 | 10/1998 |
| WO | 99/26198 | 5/1999 |
| WO | 99/35633 | 7/1999 |
| WO | 01/18563 | 3/2001 |
| WO | 02/27456 | 4/2002 |
| WO | 03/079179 | 9/2003 |
| WO | 2005/073838 | 8/2005 |
| WO | 2008/056180 | 5/2008 |

OTHER PUBLICATIONS

DeWitt et al., "Pantomation: A System for Position Tracking," Proceedings of the 2nd Symposium on Small Computers in the Arts, Oct. 1982, pp. 61-69.

Ephraim et al., "Speech Enhancement Using a Minimum Mean-Square Error Short-Time Spectral Amplitude Estimator," 1984, IEEE (13 pgs.).

Ephraim et al., "Speech Enhancement Using a Minimum Mean-Square Error Log-Spectral Amplitude Estimator," 1985, IEEE (3 pgs.).

"The Tracking Cube: A Three-Dimensional Input Device," IBM Technical Disclosure Bulletin, Aug. 8, 1989, vol. 32, No. 3B, IBM Corp., New York, U.S., pp. 91-95.

Hemmi et al., "3-D Natural Interactive Interface-Using Marker Tracking From a Single View," Systems and Computers in Japan vol. 23, No. 11, 1992, New York, U.S. (12 pgs.).

K.B. Shimoga et al., "Touch and Force Reflection for Telepresence Surgery," Engineering in Medicine and Biology Opportunities of the IEEEE, Baltimore, MD, U.S., Nov. 1994, New York, U.S., pp. 1049-1050.

Kanade et al., "A Stereo Machine for Video-rate Dense Depth Mapping and Its New Applications," The Robotics Institute, Carnegie Mellon University, Pittsburgh, PA, 1996 IEEE (7 pgs.).

Fujitsu, "Internet Development of Emulators" Abstract, Mar. 1997, vol. 48, No. 2.

T. Richardson et al., "Virtual Network Computing," IEEE Internet Computing, vol. 2, No. 1, Jan./Feb. 1998 (7 pgs.).

N. Jojie et al., "Tracking Self-Occluding Articulated Objects in Dense Disparity Maps," Computer Vision, 1999, The Proceedings of the Seventh IEEE International Conf. on Kerkyra, Greece, Sep. 1999, Los Alamitos, CA U.S., pp. 123-130.

Nakagawa et al., "A Collision Detection and Motion Image Synthesis Between a Background Image and a Foreground 3-Dimensional Object," TVRSJ vol. 4, No. 2, pp. 425-430, 1999, Japan.

(56) References Cited

OTHER PUBLICATIONS

"Reality Fusion GameCam Lets Players Get Inside the Game," Business Wire, FindArticles.Com, retrieved Jul. 12, 2010, http://findarticles.com/p/articles/mi_m0EIN/is1999_Oct_1/ai_55932662/.

G. Klinker et al., "Distributed User Tracking Concepts for Augmented Reality Applications," Augmented Reality, 2000, IEEE and ACM International Symposium, XP010520308, ISBN: 0-7695-0846-4, Germany, pp. 37-44.

J. Lanier, "Virtually There: Three-Dimensional Tele-immersion May Eventually Bring the World to Your Desk," Scientific American, ISSN: 0036-8733, 2001 (15 pgs.).

H. D'Hooge et al., "Game Design Principles for the Intel Play Me2Cam Virtual Game System," 2001, Intel Technology Journal, pp. 1-9.

N. Nishida et al., "A Method of Estimating Human Shapes by Fitting the Standard Human Model to Partial Measured Data," D-II vol. J84-D-II, No. 7, Jul. 2001, Japan, pp. 1310-1318.

G.J. Iddan et al., "3D Imaging in the Sudio (and Elsewhere . . . )," Proceedings of the SPIE, SPIE, Bellingham, VA, U.S., vol. 4298, Jan. 2001, XP008005351, pp. 48-55.

I. Mihara et al., "A Realtime Vision-Based Interface Using Motion Processor and Applications to Robotics," vol. J84-D-11, No. 9, Sep. 2001, Japan, pp. 2070-2078.

K. Wilson et al., "Audio-Video Array Source Localization for Intelligent Environments," 2002 IEEE, Dept. of Electrical Engineering and Computer Science, MIT, Cambridge, MA (4 pgs.).

R. Gvili et al., "Depth Keying," SPIE vol. 5006 (2003) 2003 SPIE-Is&T, pp. 564-574.

International Search Report issued in International Application No. PCT/US2004/015094, dated Oct. 4, 2004 (4 pages).

Y. Nakamura et al., "A Consideration on Reconstructing 3-D Model Using Object Views," 2004-01601-003, Kokkaido University, Japan, pp. 17-21.

Fiala et al., "A Panoramic Video and Acoustic Beamforming Sensor for Videoconferencing," 2004 IEEE, Computational Video Group, National Research Council, Ottawa, Canada K1A OR6.

"CFS and FS95/98/2000: How to Use the Trim Controls to Keep Your Aircraft Level," Aug. 2007, XP-002453974, http://support.microsoft.com/?scid=kb%3Ben-us%3B175195&x=13&y=15.

* cited by examiner

APPARATUS FOR IMAGE AND SOUND CAPTURE IN A GAME ENVIRONMENT

CLAIM OF PRIORITY

This application claims priority as a continuation of U.S. patent application Ser. No. 12/820,618, entitled "SELECTIVE SOUND SOURCE LISTENING IN CONJUNCTION WITH COMPUTER INTERACTIVE PROCESSING," filed on Jun. 22, 2010, now U.S. Pat. No. 8,723,984 which is a continuation of U.S. patent application Ser. No. 11/429,133, entitled "SELECTIVE SOUND SOURCE LISTENING IN CONJUNCTION WITH COMPUTER INTERACTIVE PROCESSING," filed on May 4, 2006, now U.S. Pat. No. 7,760,248 which claims benefit of U.S. Provisional Patent Application No. 60/678,413, entitled "SELECTIVE SOUND SOURCE LISTENING IN CONJUNCTION WITH COMPUTER INTERACTIVE PROCESSING", filed on May 5, 2005, and U.S. Provisional Patent Application 60/718,145, entitled "AUDIO, VIDEO, SIMULATION, AND USER INTERFACE PARADIGMS", filed Sep. 15, 2005, all of which are hereby incorporated by reference.

U.S. patent application Ser. No. 11/429,133 is a continuation in part (CIP) of U.S. patent application Ser. No. 10/207,677, entitled, "MAN-MACHINE INTERFACE USING A DEFORMABLE DEVICE", filed on Jul. 27, 2002 now U.S. Pat. No. 7,102,615; U.S. patent application Ser. No. 10/650,409, entitled, "AUDIO INPUT SYSTEM", filed on Aug. 27, 2003 now U.S. Pat. No. 7,613,310; U.S. patent application Ser. No. 10/663,236, entitled "METHOD AND APPARATUS FOR ADJUSTING A VIEW OF A SCENE BEING DISPLAYED ACCORDING TO TRACKED HEAD MOTION", filed on Sep. 15, 2003 now U.S. Pat. No. 7,883,415; U.S. patent application Ser. No. 10/759,782, entitled "METHOD AND APPARATUS FOR LIGHT INPUT DEVICE", filed on Jan. 16, 2004 now U.S. Pat. No. 7,623,115; U.S. patent application Ser. No. 10/820,469, entitled "METHOD AND APPARATUS TO DETECT AND REMOVE AUDIO DISTURBANCES", filed on Apr. 7, 2004 now U.S. Pat. No. 7,970,147; and U.S. patent application Ser. No. 11/301,673, entitled "METHOD FOR USING RELATIVE HEAD AND HAND POSITIONS TO ENABLE A POINTING INTERFACE VIA CAMERA TRACKING", filed on Dec. 12, 2005 now U.S. Pat. No. 7,646,372; all of which are hereby incorporated by reference.

RELATED APPLICATIONS

This application is related to commonly-assigned, co-pending application Ser. No. 11/381,729, to Xiao Dong Mao, entitled ULTRA SMALL MICROPHONE ARRAY, filed the same day as U.S. patent application Ser. No. 11/429,133, the entire disclosures of which are incorporated herein by reference. This application is also related to commonly-assigned, co-pending application Ser. No. 11/381,728, to Xiao Dong Mao, entitled ECHO AND NOISE CANCELLATION, filed the same day as U.S. patent application Ser. No. 11/429,133, the entire disclosures of which are incorporated herein by reference. This application is also related to commonly-assigned, co-pending application Ser. No. 11/381,725, to Xiao Dong Mao, entitled "METHODS AND APPARATUS FOR TARGETED SOUND DETECTION", filed the same day as U.S. patent application Ser. No. 11/429,133, the entire disclosures of which are incorporated herein by reference. This application is also related to commonly-assigned, co-pending application Ser. No. 11/381,727, to Xiao Dong Mao, entitled "NOISE REMOVAL FOR ELECTRONIC DEVICE WITH FAR FIELD MICROPHONE ON CONSOLE", filed the same day as the U.S. patent application Ser. No. 11/429,133, the entire disclosures of which are incorporated herein by reference. This application is also related to commonly-assigned, co-pending application Ser. No. 11/381,724, to Xiao Dong Mao, entitled "METHODS AND APPARATUS FOR TARGETED SOUND DETECTION AND CHARACTERIZATION", filed the same day as U.S. patent application Ser. No. 11/429,133, the entire disclosures of which are incorporated herein by reference. This application is also related to commonly-assigned, co-pending application Ser. No. 11/381,721, to Xiao Dong Mao, entitled "SELECTIVE SOUND SOURCE LISTENING IN CONJUNCTION WITH COMPUTER INTERACTIVE PROCESSING", filed the same day as U.S. patent application Ser. No. 11/429,133, the entire disclosures of which are incorporated herein by reference. This application is also related to commonly-assigned, co-pending application Ser. No. 11/418,988, to Xiao Dong Mao, entitled "METHODS AND APPARATUSES FOR ADJUSTING A LISTENING AREA FOR CAPTURING SOUNDS", filed the same day as U.S. patent application Ser. No. 11/429,133, the entire disclosures of which are incorporated herein by reference. This application is also related to commonly-assigned, co-pending application Ser. No. 11/418,989, to Xiao Dong Mao, entitled "METHODS AND APPARATUSES FOR CAPTURING AN AUDIO SIGNAL BASED ON VISUAL IMAGE", filed the same day as U.S. patent application Ser. No. 11/429,133, the entire disclosures of which are incorporated herein by reference. This application is also related to commonly-assigned, co-pending application Ser. No. 11/429,047, to Xiao Dong Mao, entitled "METHODS AND APPARATUSES FOR CAPTURING AN AUDIO SIGNAL BASED ON A LOCATION OF THE SIGNAL", filed the same day as U.S. patent application Ser. No. 11/429,133, the entire disclosures of which are incorporated herein by reference. This application is also related to commonly-assigned, co-pending application Ser. No. 11/429,414, to Richard Marks et al., entitled "COMPUTER IMAGE AND AUDIO PROCESSING OF INTENSITY AND INPUT DEVICES FOR INTERFACING WITH A COMPUTER PROGRAM", filed the same day as U.S. patent application Ser. No. 11/429,133, the entire disclosures of which are incorporated herein by reference.

BACKGROUND

Description of the Related Art

The video game industry has seen many changes over the years. As computing power has expanded, developers of video games have likewise created game software that takes advantage of these increases in computing power. To this end, video game developers have been coding games that incorporate sophisticated operations and mathematics to produce a very realistic game experience.

Example gaming platforms, may be the Sony Playstation or Sony Playstation2 (PS2), each of which is sold in the form of a game console. As is well known, the game console is designed to connect to a monitor (usually a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console is further designed with an optical disc tray for receiving game compact discs for local play through the game console. Online gaming is also possible, where a user can interactively play against or with other users over the Internet.

As game complexity continues to intrigue players, game and hardware manufacturers have continued to innovate to enable additional interactivity. In reality, however, the way in which users interact with a game has not changed dramatically over the years.

In view of the foregoing, there is a need for methods and systems that enable more advanced user interactivity with game play.

SUMMARY OF THE INVENTION

Broadly speaking, the present invention fills these needs by providing an apparatus and method that facilitates interactivity with a computer program. In one embodiment, the computer program is a game program, but without limitation, the apparatus and method can find applicability in any computer environment that may take in sound input to trigger control, input, or enable communication. More specifically, if sound is used to trigger control or input, the embodiments of the present invention will enable filtered input of particular sound sources, and the filtered input is configured to omit or focus away from sound sources that are not of interest. In the video game environment, depending on the sound source selected, the video game can respond with specific responses after processing the sound source of interest, without the distortion or noise of other sounds that may not be of interest. Commonly, a game playing environment will be exposed to many background noises, such as, music, other people, and the movement of objects. Once the sounds that are not of interest are substantially filtered out, the computer program can better respond to the sound of interest. The response can be in any form, such as a command, an initiation of action, a selection, a change in game status or state, the unlocking of features, etc.

In one embodiment, an apparatus for capturing image and sound during interactivity with a computer program is provided. The apparatus includes an image capture unit that is configured to capture one or more image frames. Also provided is a sound capture unit. The sound capture unit is configured to identify one or more sound sources. The sound capture unit generates data capable of being analyzed to determine a zone of focus at which to process sound to the substantial exclusion of sounds outside of the zone of focus. In this manner, sound that is captured and processed for the zone of focus is used for interactivity with the computer program.

In another embodiment, a method for selective sound source listening during interactivity with a computer program is disclosed. The method includes receiving input from one or more sound sources at two or more sound source capture microphones. Then, the method includes determining delay paths from each of the sound sources and identifying a direction for each of the received inputs of each of the one or more sound sources. The method then includes filtering out sound sources that are not in an identified direction of a zone of focus. The zone of focus is configured to supply the sound source for the interactivity with the computer program.

In yet another embodiment, a game system is provided. The game system includes an image-sound capture device that is configured to interface with a computing system that enables execution of an interactive computer game. The image-capture device includes video capture hardware that is capable of being positioned to capture video from a zone of focus. An array of microphones is provided for capturing sound from one or more sound sources. Each sound source is identified and associated with a direction relative to the image-sound capture device. The zone of focus associated with the video capture hardware is configured to be used to identify one of the sound sources at the direction that is in the proximity of the zone of focus.

In general, the interactive sound identification and tracking is applicable to the interfacing with any computer program of a any computing device. Once the sound source is identified, the content of the sound source can be further processed to trigger, drive, direct, or control features or objects rendered by a computer program.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings.

DETAILED DESCRIPTION

An invention is disclosed for methods and apparatus for facilitating the identification of specific sound sources and filtering out unwanted sound sources when sound is used as an interactive tool with a computer program.

In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to obscure the present invention.

Figure 1:
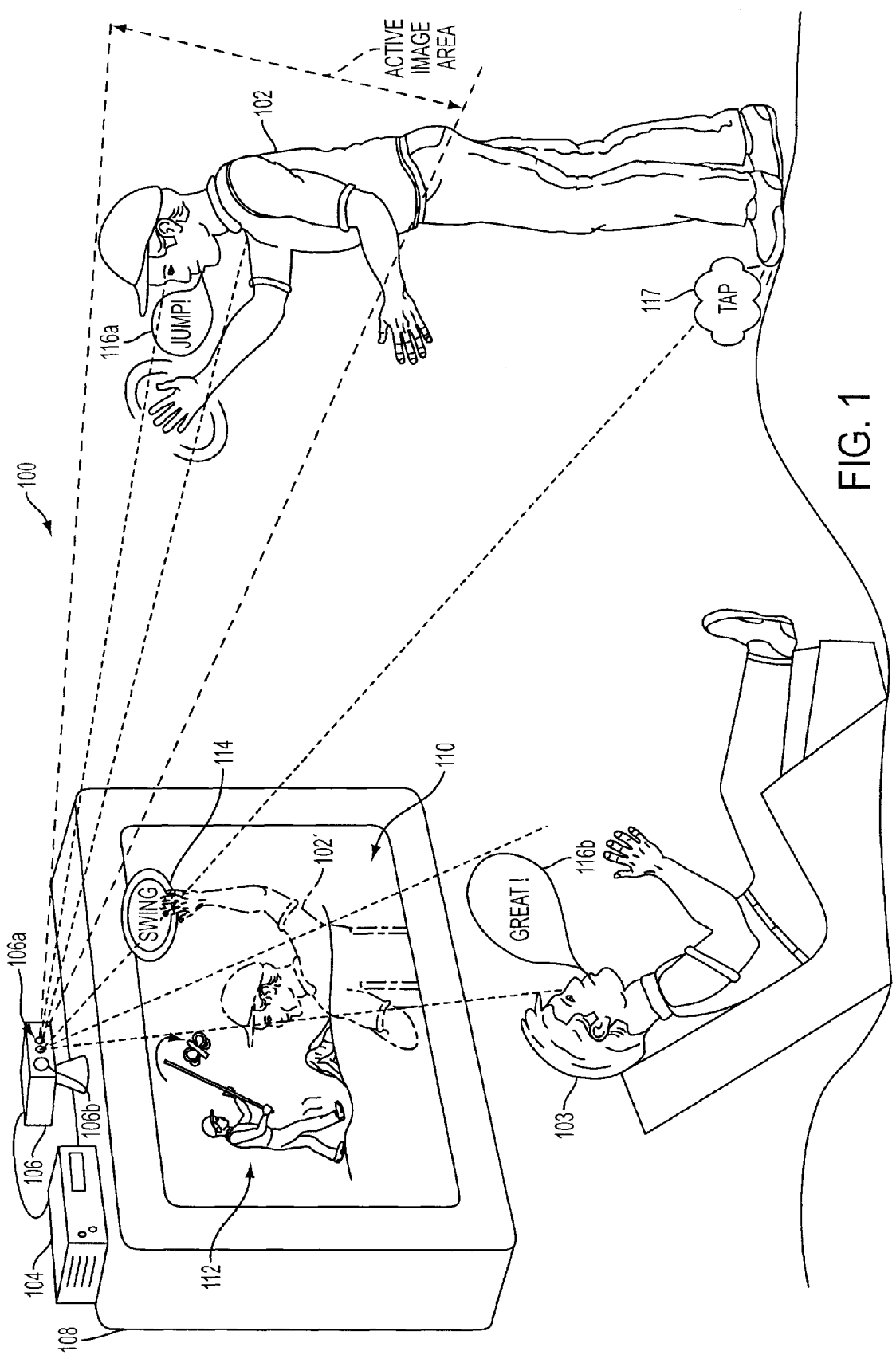
FIG. 1 shows a game environment in which a video game program may be executed for interactivity with one or more users, in accordance with one embodiment of the present invention.
Figure 2:
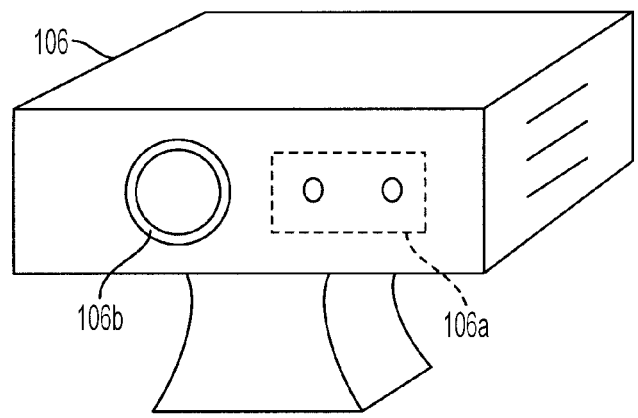
FIG. 2 illustrates a three-dimensional diagram of an example image-sound capture device, in accordance with one embodiment of the present invention.

FIG. 1 shows a game environment 100 in which a video game program may be executed for interactivity with one or more users, in accordance with one embodiment of the present invention. As illustrated, player 102 is shown in front of a monitor 108 that includes a display 110. The monitor 108 is interconnected with a computing system 104. The computing system can be a standard computer system, a game console or a portable computer system. In a specific example, but not limited to any brand, the game console can be a one manufactured by Sony Computer Entertainment Inc., Microsoft, or any other manufacturer.

Computing system 104 is shown interconnected with an image-sound capture device 106. The image-sound capture device 106 includes a sound capture unit 106a and an image capture unit 106b. The player 102 is shown interactively communicating with a game FIG. 112 on the display 110. The video game being executed is one in which input is at least partially provided by the player 102 by way of the image capture unit 106b, and the sound capture unit 106a. As illustrated, the player 102 may move his hand so as to select interactive icons 114 on the display 110. A translucent image of the player 102' is projected on the display 110 once captured by the image capture unit 106b. Thus, the player 102 knows where to move his hand in order to cause selection of icons or interfacing with the game FIG. 112. Techniques for capturing these movements and interactions can vary, but exemplary techniques are described in United Kingdom Applications GB 0304024.3 (PCT/GB2004/000693) and GB 0304022.7 (PCT/GB2004/000703), each filed on Feb. 21, 2003, and each of which is hereby incorporated by reference.

In the example shown, the interactive icon 114 is an icon that would allow the player to select "swing" so that the game FIG. 112 will swing the object being handled. In addition, the player 102 may provide voice commands that can be captured by the sound capture unit 106a and then processed by the computing system 104 to provide interactivity with the video game being executed. As shown, the sound source 116a is a voice command to "jump!". The sound source 116a will then be captured by the sound capture unit 106a, and processed by the computing system 104 to then cause the game FIG. 112 to jump. Voice recognition may be used to enable the identification of the voice commands. Alternatively, the player 102 may be in communication with remote users connected to the internet or network, but who are also directly or partially involved in the interactivity of the game.

In accordance with one embodiment of the present invention, the sound capture unit 106a is configured to include at least two microphones which will enable the computing system 104 to select sound coming from particular directions. By enabling the computing system 104 to filter out directions which are not central to the game play (or the focus), distracting sounds in the game environment 100 will not interfere with or confuse the game execution when specific commands are being provided by the player 102. For example, the game player 102 may be tapping his feet and causing a tap noise which is a non-language sound 117. Such sound may be captured by the sound capture unit 106a, but then filtered out, as sound coming from the player's feet 102 is not in the zone of focus for the video game.

As will be described below, the zone of focus is preferably identified by the active image area that is the focus point of the image capture unit 106b. In an alternative manner, the zone of focus can be manually selected from a choice of zones presented to the user after an initialization stage. Continuing with the example of FIG. 1, a game observer 103 may be providing a sound source 116b which could be distracting to the processing by the computing system during the interactive game play. However, the game observer 103 is not in the active image area of the image capture unit 106b and thus, sounds coming from the direction of game observer 103 will be filtered out so that the computing system 104 will not erroneously confuse commands from the sound source 116b with the sound sources coming from the player 102, as sound source 116a.

The image-sound capture device 106 includes an image capture unit 106b, and the sound capture unit 106a. The image-sound capture device 106 is preferably capable of digitally capturing image frames and then transferring those image frames to the computing system 104 for further processing. An example of the image capture unit 106b is a web camera, which is commonly used when video images are desired to be captured and then transferred digitally to a computing device for subsequent storage or communication over a network, such as the internet. Other types of image capture devices may also work, whether analog or digital, so long as the image data is digitally processed to enable the identification and filtering. In one preferred embodiment, the digital processing to enable the filtering is done in software, after the input data is received. The sound capture unit 106a is shown including a pair of microphones (MIC1 and MIC2). The microphones are standard microphones, which can be integrated into the housing that makes up the image-sound capture device 106.

Figure 3A:
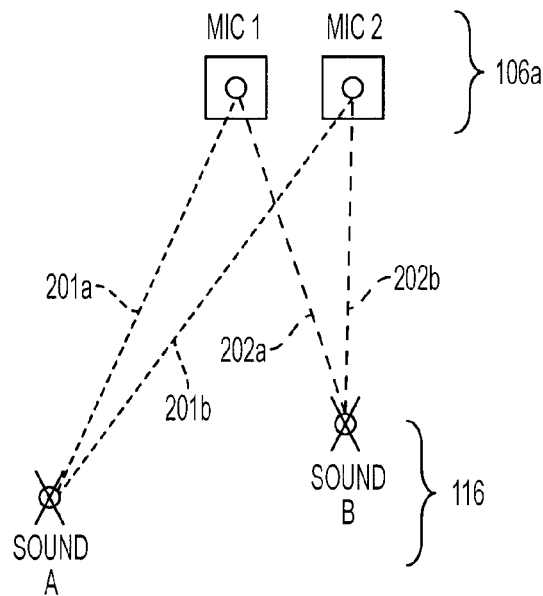
FIGS. 3A and 3B illustrate the processing of sound paths at different microphones that are designed to receive the input, and logic for outputting the selected sound source, in accordance with one embodiment of the present invention.
Figure 3B:
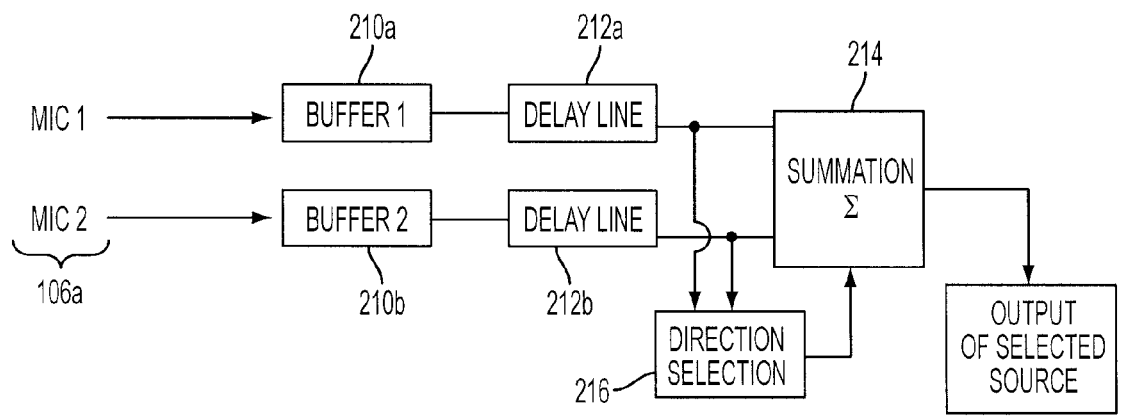

FIG. 3A illustrates sound capture units 106a when confronted with sound sources 116 from sound A and sound B. As shown, sound A will project its audible sound and will be detected by MIC1 and MIC2 along sound paths 201a and 201b. Sound B will be projected toward MIC1 and MIC2 over sound paths 202a and 202b. As illustrated, the sound paths for sound A will be of different lengths, thus providing for a relative delay when compared to sound paths 202a and 202b. The sound coming from each of sound A and sound B will then be processed using a standard triangulation algorithm so that direction selection can occur in box 216, shown in FIG. 3B. The sound coming from MIC1 and MIC2 will each be buffered in buffers 1 and 2 (210a, 210b), and passed through delay lines (212a, 212b). In one embodiment, the buffering and delay process will be controlled by software, although hardware can be custom designed to handle the operations as well. Based on the triangulation, direction selection 216 will trigger identification and selection of one of the sound sources 116.

The sound coming from each of MICs1 and MICs2 will be summed in box 214 before being output as the output of the selected source. In this manner, sound coming from directions other than the direction in the active image area will be filtered out so that such sound sources do not distract processing by the computer system 104, or distract communication with other users that may be interactively playing a video game over a network, or the internet.

Figure 4:
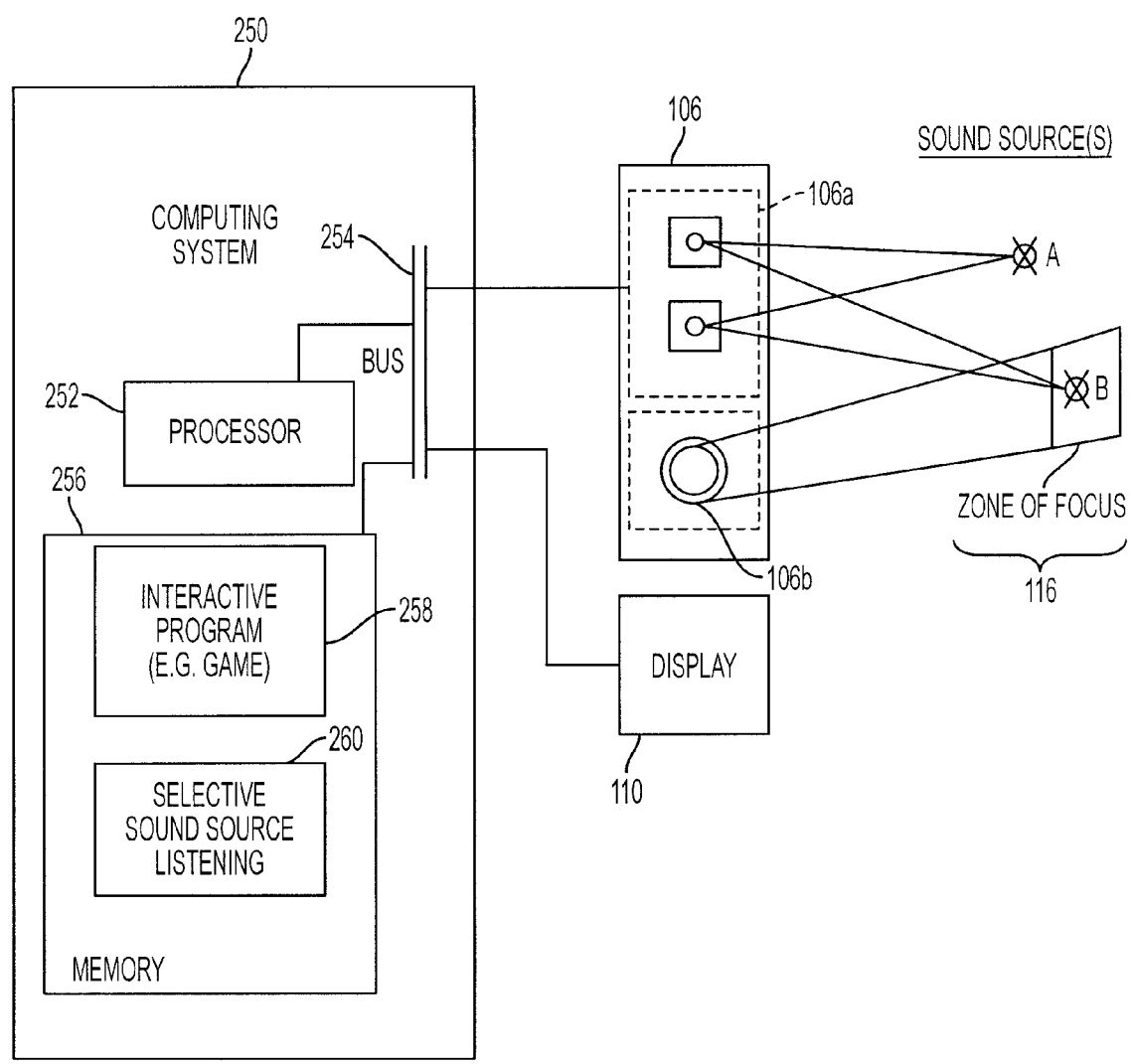
FIG. 4 illustrates an example computing system interfacing with an image-sound capture device for processing input sound sources, in accordance with one embodiment of the present invention.

FIG. 4 illustrates a computing system 250 that may be used in conjunction with the image-sound capture device 106, in accordance with one embodiment of the present invention. The computing system 250 includes a processor 252, and memory 256. A bus 254 will interconnect the processor and the memory 256 with the image-sound capture device 106. The memory 256 will include at least part of the interactive program 258, and also include selective sound source listening logic or code 260 for processing the received sound source data. Based on where the zone of focus is identified to be by the image capture unit 106b, sound sources outside of the zone of focus will be selectively filtered by the selective sound source listening logic 260 being executed (e.g., by the processor and stored at least partially in the memory 256). The computing system is shown in its most simplistic form, but emphasis is placed on the fact that any hardware configuration can be used, so long as the hardware can process the instructions to effect the processing of the incoming sound sources and thus enable the selective listening.

The computing system 250 is also shown interconnected with the display 110 by way of the bus. In this example, the zone of focus is identified by the image capture unit being focused toward the sound source B. Sound coming from other sound sources, such as sound source A will be substantially filtered out by the selective sound source listening logic 260 when the sound is captured by the sound capture unit 106*a* and transferred to the computing system 250.

In one specific example, a player can be participating in an internet or networked video game competition with another user where each user's primary audible experience will be by way of speakers. The speakers may be part of the computing system or may be part of the monitor 108. Suppose, therefore, that the local speakers are what is generating sound source A as shown in FIG. 4. In order not to feedback the sound coming out of the local speakers for sound source A to the competing user, the selective sound source listening logic 260 will filter out the sound of sound source A so that the competing user will not be provided with feedback of his or her own sound or voice. By supplying this filtering, it is possible to have interactive communication over a network while interfacing with a video game, while advantageously avoiding destructive feedback during the process.

Figure 5:
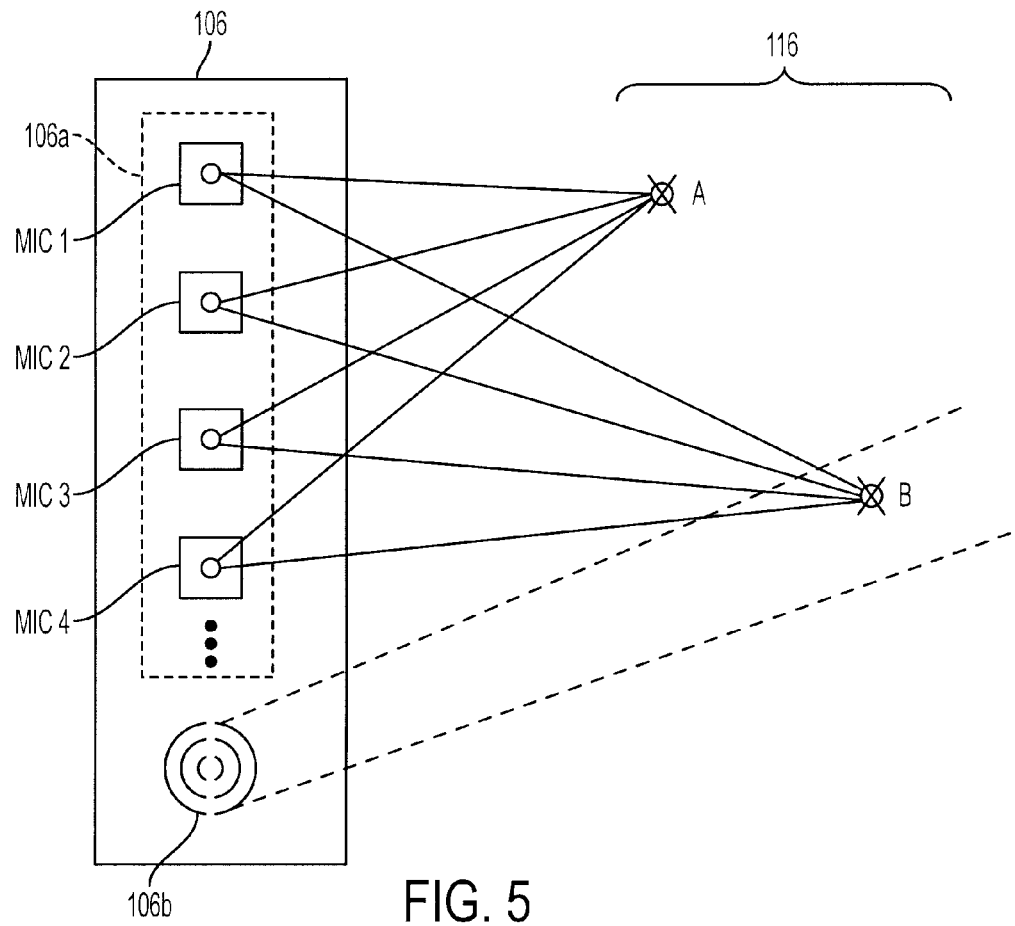
FIG. 5 illustrates an example where multiple microphones are used to increase the precision of the direction identification of particular sound sources, in accordance with one embodiment of the present invention.
Figure 6:
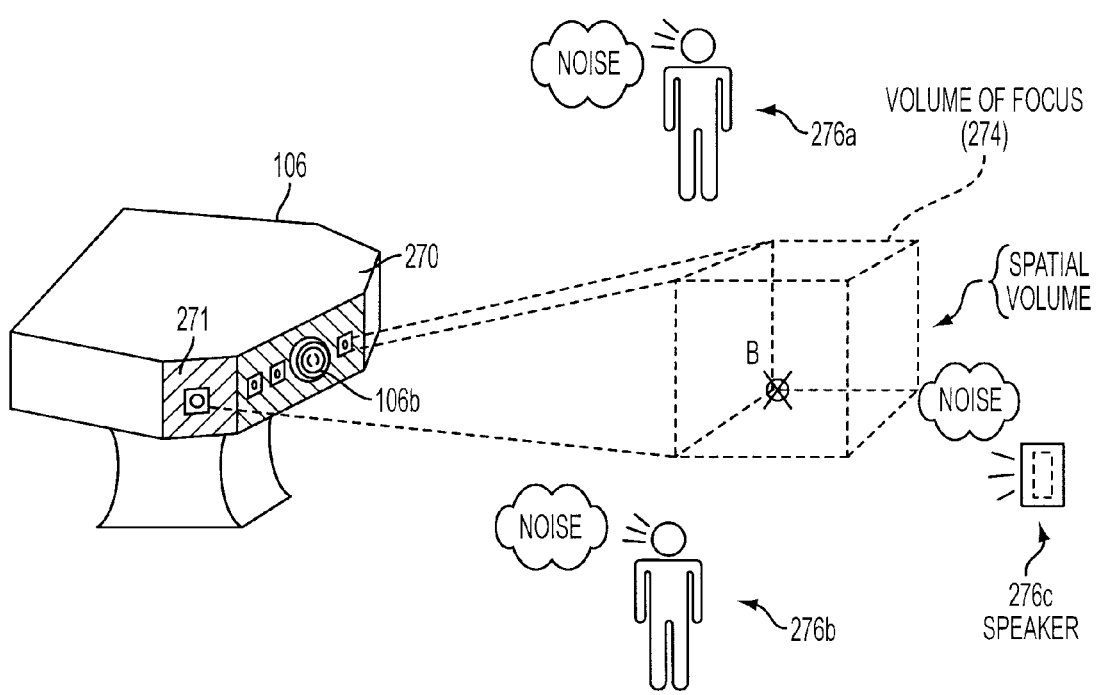
FIG. 6 illustrates an example in which sound is identified at a particular spatial volume using microphones in different planes, in accordance with one embodiment of the present invention.

FIG. 5 illustrates an example where the image-sound capture device 106 includes at least four microphones (MIC1 through MIC4). The sound capture unit 106*a*, is therefore capable of triangulation with better granularity to identify the location of sound sources 116 (A and B). That is, by providing an additional microphone, it is possible to more accurately define the location of the sound sources and thus, eliminate and filter out sound sources that are not of interest or can be destructive to game play or interactivity with a computing system. As illustrated in FIG. 5, sound source 116 (B) is the sound source of interest as identified by the video capture unit 106*b*. Continuing with example of FIG. 5, FIG. 6 identifies how sound source B is identified to a spatial volume.

The spatial volume at which sound source B is located will define the volume of focus 274. By identifying a volume of focus, it is possible to eliminate or filter out noises that are not within a specific volume (i.e., which are not just in a direction). To facilitate the selection of a volume of focus 274, the image-sound capture device 106 will preferably include at least four microphones. At least one of the microphones will be in a different plane than three of the microphones. By maintaining one of the microphones in plane 271 and the remainder of the four in plane 270 of the image-sound capture device 106, it is possible to define a spatial volume.

Consequently, noise coming from other people in the vicinity (shown as 276*a* and 276*b*) will be filtered out as they do not lie within the spatial volume defined in the volume focus 274. Additionally, noise that may be created just outside of the spatial volume, as shown by speaker 276*c*, will also be filtered out as it falls outside of the spatial volume.

Figure 7:
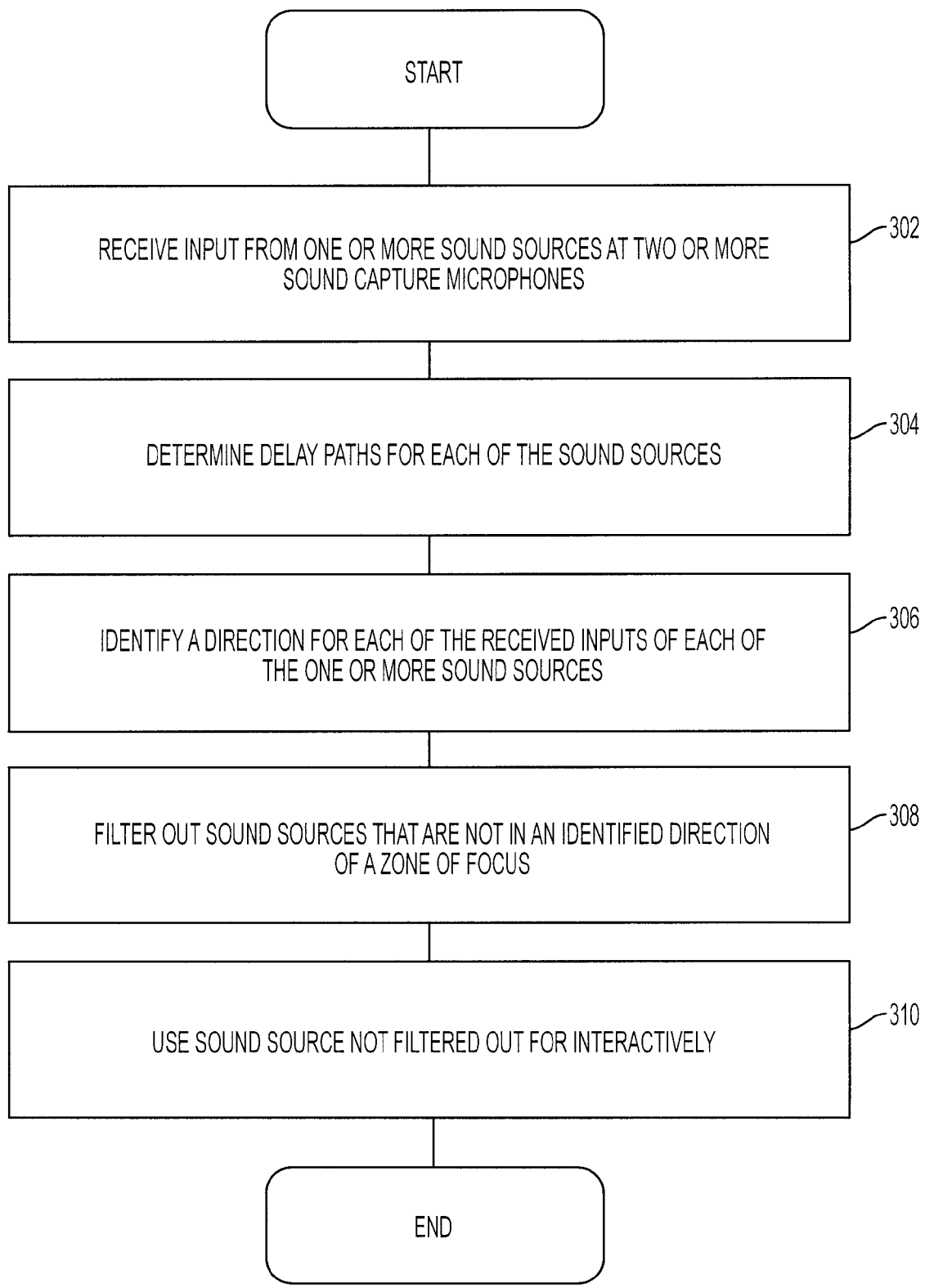
FIGS. 7 and 8 illustrates exemplary method operations that may be processed in the identification of sound sources and exclusion of non-focus sound sources, in accordance with one embodiment of the present invention.

FIG. 7 illustrates a flowchart diagram in accordance with one embodiment of the present invention. The method begins at operation 302 where input is received from one or more sound sources at two or more sound capture microphones. In one example, the two or more sound capture microphones are integrated into the image-sound capture device 106. Alternatively, the two or more sound capture microphones can be part of a second module/housing that interfaces with the image capture unit 106*b*. Alternatively, the sound capture unit 106*a* can include any number of sound capture microphones, and sound capture microphones can be placed in specific locations designed to capture sound from a user that may be interfacing with a computing system.

The method moves to operation 304 where a delay path for each of the sound sources is determined. Example delay paths are defined by the sound paths 201 and 202 of FIG. 3A. As is well known, the delay paths define the time it takes for sound waves to travel from the sound sources to the specific microphones that are situated to capture the sound. Based on the delay it takes sound to travel from the particular sound sources 116, the microphones can determine what the delay is and approximate location from which the sound is emanating from using a standard triangulation algorithm.

The method then continues to operation 306 where a direction for each of the received inputs of the one or more sound sources is identified. That is, the direction from which the sound is originating from the sound sources 116 is identified relative to the location of the image-sound capture device, including the sound capture unit 106*a*. Based on the identified directions, sound sources that are not in an identified direction of a zone (or volume) of focus are filtered out in operation 308. By filtering out the sound sources that are not originating from directions that are in the vicinity of the zone of focus, it is possible to use the sound source not filtered out for interactivity with a computer program, as shown in operation 310.

For instance, the interactive program can be a video game in which the user can interactively communicate with features of the video game, or players that may be opposing the primary player of the video game. The opposing player can either be local or located at a remote location and be in communication with the primary user over a network, such as the internet. In addition, the video game can also be played between a number of users in a group designed to interactively challenge each other's skills in a particular contest associated with the video game.

Figure 8:
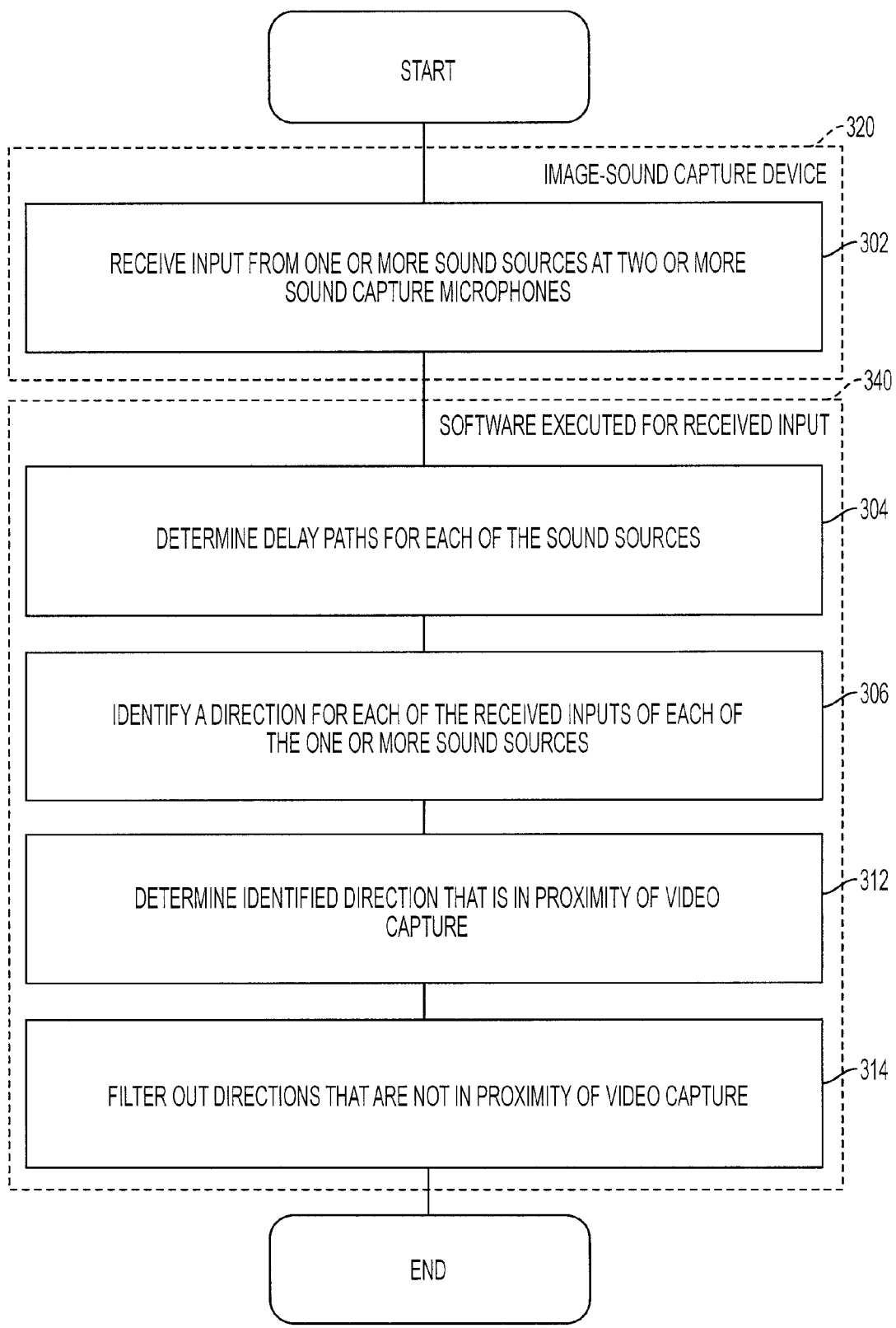

FIG. 8 illustrates a flowchart diagram in which image-sound capture device operations 320 are illustrated separate from the software executed operations that are performed on the received input in operations 340. Thus, once the input from the one or more sound sources at the two or more sound capture microphones is received in operation 302, the method proceeds to operation 304 where in software, the delay path for each of the sound sources is determined. Based on the delay paths, a direction for each of the received inputs is identified for each of the one or more sound sources in operation 306, as mentioned above.

At this point, the method moves to operation 312 where the identified direction that is in proximity of video capture is determined. For instance, video capture will be targeted at an active image area as shown in FIG. 1. Thus, the proximity of video capture would be within this active image area (or volume), and any direction associated with a sound source that is within this or in proximity to this, image-active area, will be determined. Based on this determination, the method proceeds to operation 314 where directions (or volumes) that are not in proximity of video capture are filtered out. Accordingly, distractions, noises and other extraneous input that could interfere in video game play of the primary player will be filtered out in the processing that is performed by the software executed during game play.

Consequently, the primary user can interact with the video game, interact with other users of the video game that are actively using the video game, or communicate with other users over the network that may be logged into or associated with transactions for the same video game that is of interest. Such video game communication, interactivity and control will thus be uninterrupted by extraneous noises and/or observers that are not intended to be interactively communicating or participating in a particular game or interactive program.

It should be appreciated that the embodiments described herein may also apply to on-line gaming applications. That is, the embodiments described above may occur at a server that sends a video signal to multiple users over a distributed network, such as the Internet, to enable players at remote noisy locations to communicate with each other. It should be further appreciated that the embodiments described herein may be implemented through either a hardware or a software implementation. That is, the functional descriptions discussed above may be synthesized to define a microchip having logic configured to perform the functional tasks for each of the modules associated with the noise cancellation scheme.

Also, the selective filtering of sound sources can have other applications, such as telephones. In phone use environments, there is usually a primary person (i.e., the caller) desiring to have a conversation with a third party (i.e., the callee). During that communication, however, there may be other people in the vicinity who are either talking or making noise. The phone, being targeted toward the primary user (by the direction of the receiver, for example) can make the sound coming from the primary user's mouth the zone of focus, and thus enable the selection for listening to only the primary user. This selective listening will therefore enable the substantial filtering out of voices or noises that are not associated with the primary person, and thus, the receiving party will be able to receive a more clear communication from the primary person using the phone.

Additional technologies may also include other electronic equipment that can benefit from taking in sound as an input for control or communication. For instance, a user can control settings in an automobile by voice commands, while avoiding other passengers from disrupting the commands. Other applications may include computer controls of applications, such as browsing applications, document preparation, or communications. By enabling this filtering, it is possible to more effectively issue voice or sound commands without interruption by surrounding sounds. As such, any electronic apparatus.

Further, the embodiments of the present invention have a wide array of applications, and the scope of the claims should be read to include any such application that can benefit from the such embodiments.

For instance, in a similar application, it may be possible to filter out sound sources using sound analysis. If sound analysis is used, it is possible to use as few as one microphone. The sound captured by the single microphone can be digitally analyzed (in software or hardware) to determine which voice or sound is of interest. In some environments, such as gaming, it may be possible for the primary user to record his or her voice once to train the system to identify the particular voice. In this manner, exclusion of other voices or sounds will be facilitated. Consequently, it would not be necessary to identify a direction, as filtering could be done based one sound tones and/or frequencies.

All of the advantages mentioned above with respect to sound filtering, when direction and volume are taken into account, are equally applicable.

With the above embodiments in mind, it should be understood that the invention may employ various computer-implemented operations involving data stored in computer systems. These operations include operations requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The above described invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a communications network.

The invention can also be embodied as computer readable code on a computer readable medium. The computer readable medium is any data storage device that can store data which can be thereafter read by a computer system, including an electromagnetic wave carrier. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. An apparatus for capturing image and sound during interactivity with a computer game in a game environment, comprising:
    a housing;
    a base stand for supporting the housing;
    an image capture device defined along a front portion of the housing;
    an array of microphones defined along the front portion of the housing, the array of microphones defined by a single microphone positioned on a first lateral side of the image capture device and two or more microphones positioned on a second lateral side of the image capture device opposite the first side;
    a connector for connecting to a computing device;
    wherein the microphones of the microphone array are linearly arranged;
    wherein a distance between the single microphone on the first lateral side and a first one of the microphones on the second lateral side is greater than a distance between the first one of the microphones on the second lateral side and a second one of the microphones on the second lateral side, the first one of the microphones being a nearest microphone to the single microphone and the second one of the microphones being a next nearest microphone to the single microphone.

2. The apparatus for capturing image and sound of claim 1, wherein at least one of the microphones of the microphone array is oriented towards a direction different than a direction towards which the image capture device is oriented.

3. The apparatus for capturing image and sound of claim 1, wherein the array of microphones includes four microphones only.

4. The apparatus for capturing image and sound of claim 1, wherein the image capture device is a depth camera that captures depth values for a plurality of pixels.

5. The apparatus for capturing image and sound of claim 4, further comprising an infrared light for providing controlled infrared lighting;
wherein the depth camera uses the controlled infrared lighting to obtain the depth values.

6. The apparatus for capturing image and sound of claim 5, wherein the image capture device defines a maximum depth detection range beyond which depth values are not detected.

7. The apparatus for capturing image and sound of claim 6, further comprising,
logic initiating tracking of an object when the object is placed within the depth range and terminating tracking of the object when the object is placed beyond the depth range.

8. The apparatus for capturing image and sound of claim 4, further comprising,
logic for mapping depth values of a control object captured by the depth camera to a model, wherein in response to movement of the control object, a position of the model is moved in a corresponding fashion.

9. The apparatus for capturing image and sound of claim 1, wherein the image capture device is an RGB camera that captures RGB values for a plurality of pixels.

10. A system for providing interactive gameplay of a video game, comprising for capturing image and sound during interactivity with a computer game in a game environment, comprising:
a computing device, the computing device including a processor for executing a video game;
an image and sound capture device connected to the computing device, the image and sound capture device including a housing, a base stand for supporting the housing, an image capture device defined along a front portion of the housing, an array of microphones defined along the front portion of the housing, the array of microphones defined by a single microphone positioned on a first lateral side of the image capture device and two or more microphones positioned on a second lateral side of the image capture device opposite the first lateral side;
wherein the microphones of the microphone array are linearly arranged; and
wherein a distance between the single microphone on the first lateral side and a first one of the microphones on the second lateral side is greater than a distance between the first one of the microphones on the second lateral side and a second one of the microphones on the second lateral side, the first one of the microphones being a nearest microphone to the single microphone and the second one of the microphones being a next nearest microphone to the single microphone.

11. The system for providing interactive gameplay of claim 10, wherein the image capture device is a depth camera that captures depth values for a plurality of pixels.

12. The system for providing interactive gameplay of claim 11, further comprising an infrared light for providing controlled infrared lighting;
wherein the depth camera uses the controlled infrared lighting to obtain the depth values.

13. The system for providing interactive gameplay of claim 12, wherein the image capture device defines a maximum depth detection range beyond which depth values are not detected.

14. The system for providing interactive gameplay of claim 10, further comprising
logic for mapping depth values of a control object captured by the depth camera to a model, wherein in response to movement of the control object, a position of the model is moved in a corresponding fashion.

15. The system for providing interactive gameplay of claim 14, wherein the model is a skeleton model associated with the control object, the skeleton model defining one or more joint angles.

16. The system for providing interactive gameplay of claim 10, further comprising,
logic for associating a movement of a control object captured by the image capture device with a corresponding predefined animation of a character of the video game.

17. The system for providing interactive gameplay of claim 10, further comprising,
logic for applying a movement of a control object captured by the image capture device as constraint information to directly drive the animation of a character image.

18. The system for providing interactive gameplay of claim 10, wherein the image capture device is an RGB camera that captures RGB values for a plurality of pixels.

* * * * *